(12) United States Patent
Montgomery et al.

(10) Patent No.: US 6,471,482 B2
(45) Date of Patent: Oct. 29, 2002

(54) FREQUENCY-MISTUNED LIGHT-WEIGHT TURBOMACHINERY BLADE ROWS FOR INCREASED FLUTTER STABILITY

(75) Inventors: Matthew Montgomery, Jupiter, FL (US); Marc Samit, Farmington, CT (US); John A. Orosa, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/728,238

(22) Filed: Nov. 30, 2000

(65) Prior Publication Data

US 2002/0064458 A1 May 30, 2002

(51) Int. Cl.⁷ .................................. F01D 5/10
(52) U.S. Cl. ........................ 416/203; 416/500
(58) Field of Search ................... 416/203, 500

(56) References Cited

U.S. PATENT DOCUMENTS

| | | | | |
|---|---|---|---|---|
| 3,536,417 A | * | 10/1970 | Stiefel et al. | 416/203 X |
| 4,097,192 A | * | 6/1978 | Kulina | 416/500 X |
| 4,332,525 A | * | 6/1982 | Cheney, Jr. | 416/134 A |
| 4,878,810 A | * | 11/1989 | Evans | 416/203 |
| 4,919,593 A | * | 4/1990 | Brown | 29/889.7 |
| 5,286,168 A | | 2/1994 | Smith | |
| 5,299,914 A | * | 4/1994 | Schilling | 416/203 |
| 5,474,421 A | * | 12/1995 | Rossmann | 416/203 |
| 5,524,341 A | * | 6/1996 | Ferleger et al. | 29/889.21 |
| 5,667,361 A | | 9/1997 | Yaeger et al. | |
| 6,042,338 A | * | 3/2000 | Brafford et al. | 416/203 |
| 6,195,982 B1 | * | 3/2001 | Gysling et al. | 415/119 |
| 6,379,112 B1 | * | 4/2002 | Montgomery | 415/119 |

FOREIGN PATENT DOCUMENTS

| | | | | |
|---|---|---|---|---|
| DE | 1177277 | * | 9/1964 | 416/203 |
| GB | 1293553 | * | 10/1972 | 416/203 |
| JP | 0044495 A | * | 4/1981 | 416/203 |
| RU | 324889 A | * | 5/1984 | 416/203 |
| SE | 94530 | * | 2/1939 | 416/203 |

* cited by examiner

*Primary Examiner*—John E. Ryznic
(74) *Attorney, Agent, or Firm*—Bachman & LaPointe, P.C.

(57) ABSTRACT

The present invention relates to an array of flow directing elements having increased flutter stability for use in turbomachinery devices. The array comprises at least one high frequency flow directing element and at least one low frequency flow directing element. In a preferred embodiment, the array comprises a plurality of alternating high frequency and low frequency flow directing elements. Each high frequency flow directing element has its three lowest frequency vibratory modes at least 2.0% higher in frequency than the three lowest frequency vibratory modes of each low frequency flow directing element. The array of the present invention has particular utility in a turbomachinery device as part of a rotor stage.

17 Claims, 4 Drawing Sheets

FREQUENCY-MISTUNED LIGHT-WEIGHT TURBOMACHINERY BLADE ROWS FOR INCREASED FLUTTER STABILITY

BACKGROUND OF THE INVENTION

The present invention relates to frequency mistuned blade rows for use in turbomachinery such as gas turbine engines, steam engines, and the like. More particularly, the invention relates to an array of flow directing elements to be used as the rotor blades of multi-stage fans without shrouds that have improved flutter resistance and decreased weight.

Many aircraft jet engines employ the turbofan cycle, in which a fan section of turbomachinery is used to both generate thrust and supply compressed air to the core of the engine. The fan section of engines for commercial applications typically consists of an isolated rotor, whereas the fan section of engines for military applications typically consists of multiple stages of blades and vanes. The latter configuration is referred to as a multi-stage fan. It faces more challenging aerodynamic conditions than an isolated fan due to the interaction of the fan stages. One consequence of this interaction is that the first stage rotor of a multi-stage fan has stricter design restrictions for avoiding flutter than an isolated fan.

Axial flow turbomachinery blades are subject to destructive vibrations due to unsteady interaction of the blades with the working fluid. These vibrations are generally categorized as forced response or flutter. Both categories of vibrations can cause structural failure of the turbomachinery blades.

The turbomachinery blades have natural vibration modes of increasing frequency and complexity of the mode shape. The simplest and lowest frequency modes are typically first bending (1B), second bending (2B), and first torsion (1T). First bending is a motion normal to the flat surface of the airfoil portion of the blade in which the entire span of the airfoil moves in the same direction. Second bending is similar to first bending, but with a change in the sense of the motion somewhere along the span of the airfoil so that the upper and lower portions of the airfoil move in opposite directions. First torsion is a twisting motion around an elastic axis, which is parallel to the span of the airfoil, in which the entire span of the airfoil on each side of the elastic axis moves in the same direction.

Forced response vibration typically occurs when an integral multiple of an engine's rotation frequency, known as an engine order excitation, coincides with one of the natural vibration frequencies of the flow directing elements or blades. When these frequency coincidences occur, the flow directing elements or blades will vibrate in resonance. This can cause vibrations of sufficient amplitude to cause structural failure. These frequency coincidences are typically avoided by tuning the blades' natural vibration frequencies to avoid engine order excitations over rotational speed ranges where the engine spends a significant portion of its operating cycle.

Engine order excitations are characterized as multiples of the engine rotation frequency, so that a "1E" excitation is at the engine rotation frequency, a "2E" excitation is at twice the engine rotation frequency, etc. Conventional tuning criteria for unshrouded blades in the first stage of a multi-stage fan is for the 1B frequency to be above the 2E excitation frequency, and that all lower order modes, typically the four lowest frequency modes, avoid engine order excitation frequencies in the operating range. Another criterion is that the 1B frequency does not match the 2E or 3E excitation frequencies at idle operating conditions.

Flutter is an aero-elastic instability resulting from interaction of the flow over the flow directing elements or blades and the blades' natural vibration tendencies. When flutter occurs, the unsteady aerodynamic forces on a flow directing element due to its vibration add energy to the vibration, thus causing the vibration amplitude to increase. The vibration amplitude can become large enough to cause structural failure. The operable range, in terms of pressure rise and flow rate, of the engine is restricted by various flutter phenomena.

Lower frequency vibration modes, first bending and first torsion, are the vibration modes that are typically susceptible to flutter. Conventional practice to avoid flutter is to raise the blades' first bending and first torsion vibration frequencies, and/or increase the blades' chord length and/or add a shroud to provide mechanical contact between adjacent airfoils. Thus, conventional design practices to avoid flutter add length and weight to rotor blades that is not required for aerodynamic performance, and the use of thicker blades or shrouds imposes an aerodynamic performance penalty. If flutter design restrictions are relaxed, then lighter and shorter blades can be employed, and the length and weight of the turbomachinery is reduced. Lighter parts provide obvious benefits for the turbomachinery of aircraft jet engines.

Conventional practice for unshrouded blades in the first stage of multi-stage fans is to tune the blades so that the first bending frequency is above the second harmonic of the rotation frequency. This tuning practice avoids forced response vibrations while resulting in vibration frequencies that are typically high enough to avoid flutter. Relaxing flutter design restrictions would allow the blades to be tuned so that the first bending frequency is above the first harmonic of the rotation frequency and below the second harmonic in the operating range. Since the frequency of the first bending mode is directly proportional to the thickness of the blade at the root, tuning blades to a lower frequency results in thinner blades that reduce weight and improve performance.

Blades are more susceptible to flutter instability if all blades on a rotor disk have nearly identical vibration frequencies. Advances in manufacturing technique have resulted in the production of blades that have nearly uniform properties. This uniformity is desirable to ensure consistent aerodynamic performance, but undesirable in that it increases the blades' tendency to flutter. Therefore, to ensure that a minimum level of nonuniformity of the blades is achieved, it is desirable to introduce intentional variation to mistune the blades and thus achieve flutter resistance.

These intentional variations should significantly affect the vibration frequency of the blade without compromising aerodynamic performance or introducing undue complexity in the manufacturing process. One method of achieving the frequency variation between blades is to vary the thickness of individual blades around the rotor. Other methods include, but are not limited to, variations in chord, camber angle, and profile shape. Variations of blade geometry in the inner span region, where the flow tends to be subsonic, tend to introduce less aerodynamic performance variation than geometric variations in the outer span region, where the flow tends to be supersonic.

Flutter resistance increases as the difference in frequency between blades increases, up to a theoretical maximum. Manufacturing tolerances introduce frequency variations that are typically +/−3% of the nominal frequency. However, modern manufacturing techniques can result in frequency variations that are less than 1%, which can reduce flutter resistance. Thus, for manufacturing processes which result in a relatively small variation in frequency, intentional mistuning can increase flutter resistance.

The use of nonuniformity in vibration frequency to avoid flutter instability for turbomachinery blades is addressed in U.S. Pat. No. 5,286,168 to Smith. The approach discussed therein uses frequency mistuning for flutter avoidance, but does not use the reduced flutter susceptibility to alter blade tuning criteria and thus lower blade weight.

The use of nonuniformity in shroud angle to avoid flutter instability for a blade row of shrouded blades is addressed in U.S. Pat. No. 5,667,361 to Yaeger et al. The approach discussed in the Yaeger et al. patent however is unattractive for modern gas turbine engines since the use of shrouds imposes an aerodynamic performance penalty.

SUMMARY OF THE INVENTION

Accordingly, it is an object of the present invention to provide an improved array of flow directing elements for use in turbomachinery devices.

It is a further object of the present invention to provide an improved array as above which is mistuned to increase flutter stability.

It is yet a further object of the present invention to provide an array as above which is relatively light in weight and does not disturb aerodynamic performance.

The foregoing objects are attained by the array of the present invention.

An improved array of flow directing elements for use in turbomachinery devices, such as gas turbine engines, steam engines, and the like is provided by the present invention. The improved array broadly comprises a row of alternating high frequency and low frequency flow directing elements or blades. The high frequency flow directing elements each have their three lowest frequency vibratory modes at least 2.0% higher in frequency than the three lowest frequency vibratory modes of each low frequency flow directing element. The array of the present invention may be used in turbomachinery as a blade row for a rotor stage.

Other details of the array of flow directing elements, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
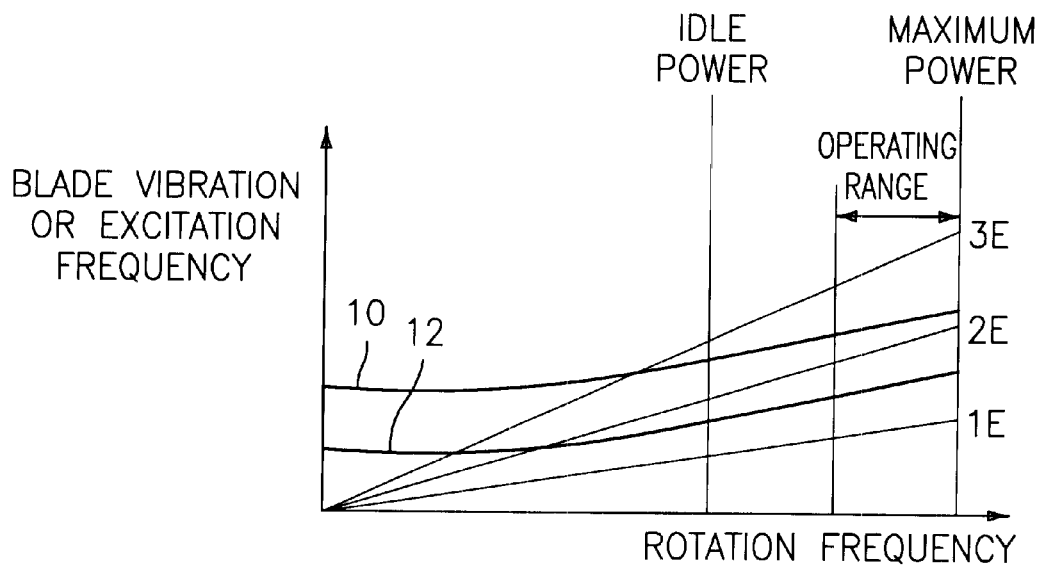
FIG. 1 is a frequency diagram in which the vibration frequencies of high and low frequency flow directing elements straddle different engine order excitations resulting in a 1E-2E pair of flow directing elements.
Figure 2:
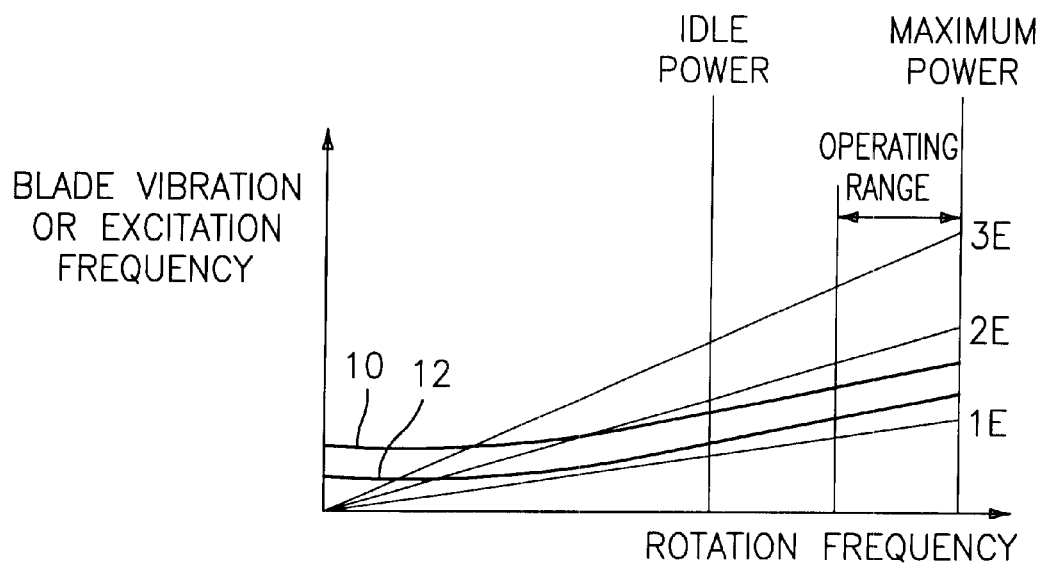
FIG. 2 is a frequency diagram in which the vibration frequencies of both high and low frequency flow directing elements are between the same engine order excitations resulting in a 1E pair of flow directing elements.

Frequency mistuning can be applied to avoid flutter using at least two different tuning philosophies. As with tuned arrays of flow directing elements known as blade rows, forced vibration must be avoided by placing the natural vibration frequencies of the flow directing elements or blades between engine order excitations in the operating range of the engine. For mistuned arrays or blade rows, the first bending frequency of two sets of flow directing elements or blades, one a high frequency flow directing element or blade 10 and the other a low frequency flow directing element or blade 12, can straddle different engine order excitations as shown in FIG. 1. Alternatively, the first bending frequency of the high frequency blade 10 and the low frequency blade 12 can be placed between adjacent engine order excitations as shown in FIG. 2. The flow directing elements or blades 10 and 12 in FIG. 1 are referred to as a 1E-2E pair, and the elements or blades 10 and 12 in FIG. 2 are referred to as a 1E pair. Similar tuning criteria are applied to higher frequency structural modes.

Figure 3:
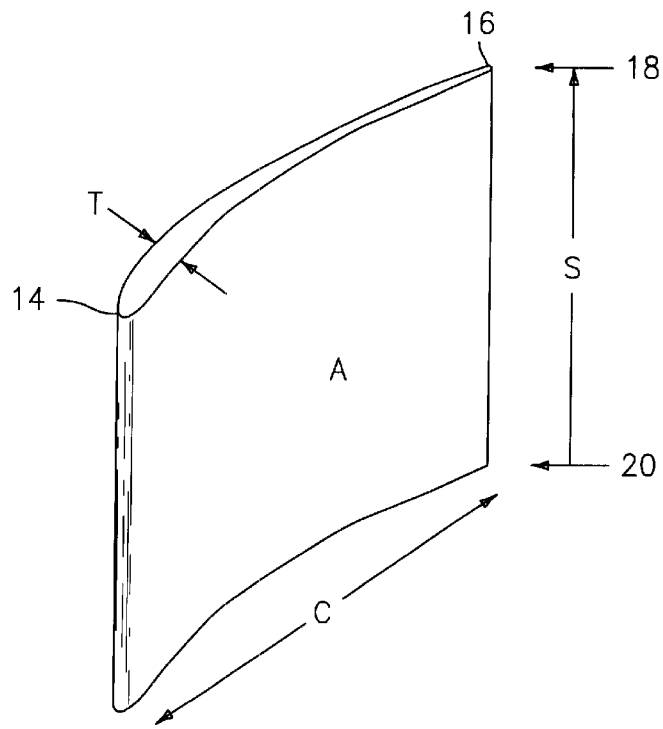
FIG. 3 is a schematic representation of a typical airfoil.

As shown in FIG. 3, an airfoil A has a leading edge 14, a trailing edge 16, a tip portion 18, and a root portion 20. The primary geometric properties of the airfoil A that determine its weight are the chord C, the span S, and the thickness T.

Figure 4A:
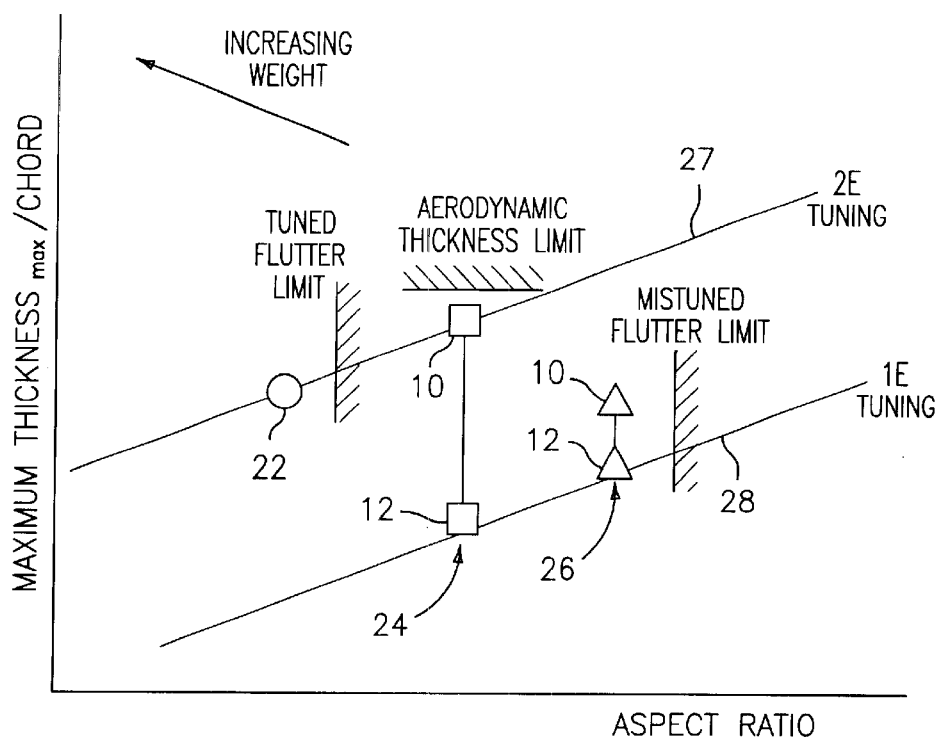
FIG. 4A is a diagram comparing tuned and mistuned first stage flow directing elements in a multi-stage fan in terms of maximum-thickness-to-chord ratio versus aspect ratio.
Figure 4B:
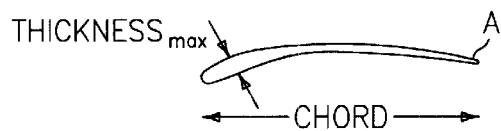
FIG. 4B is a schematic representation of an airfoil showing its chord and maximum thickness.

The weight advantages of the different mistuning design philosophies described above are illustrated in FIG. 4A and 4B. FIG. 4A which contrasts conventional tuned blades 22 against a mistuned 1E-2E pair 24 and a mistuned 1E pair 26 in terms of maximum thickness-to-chord ratio and aspect ratio (the ratio of the chord to span). These blades represent those found in the first stage of unshrouded, multi-stage fans. The two slanted lines 27 and 28 in FIG. 4A show the thickness required for the first vibration mode to be tuned above the first harmonic (1E) or second harmonic (2E) of rotation frequency, respectively. The prior art for such fan blades 22 is shown as a 2E blade, which is limited to lower aspect ratio by the flutter limit for tuned blades. Mistuning relaxes the flutter restriction, thus permitting lower blade weight by decreasing thickness and/or increasing aspect ratio.

As FIG. 4A illustrates, the 1E pairing method of mistuning significantly reduces fan weight by allowing thinner blades and increased blade aspect ratio. Thinner blades are not only themselves lighter but also reduce the required weight of the disk that must retain them. Further, lighter individual blades result in reduced imbalance loads during blade liberation, a required engine design condition. Reduced imbalance loads due to blade liberation lead to additional weight reductions because containment systems, bearing supports, engine mounts, case flanges, airframe interfaces, and other engine and aircraft static structures are challenged to a lesser degree. Increasing the aspect ratio of blade designs reduces weight by shortening the chord or axial length of the blade, which in turn allows the blade sections near the tip to be thinner, given the same frequency requirements for the first several natural vibration modes. The shorter chord length by itself does not lower total blade or disk weight because the number of blades must be proportionately increased to maintain aerodynamic performance. The weight savings comes from the thinner outboard blade sections and from reduced individual blade weight. This reduces the maximum imbalance loads applied to the static support structure in the case of a liberated blade, which further reduces weight.

The 1E-2E pairing method of mistuning reduces weight to a lesser extent, but provides greater flutter margin by virtue of its greater separation in blade frequencies and higher average frequency, as compared to the 1E pairing method. Whereas the 1E blade pair can push aspect ratio to the mistuned flutter limit, a 1E-2E pair will be limited to a lower aspect ratio by the aerodynamic penalties of high thickness-to-chord ratio of the high frequency (2E) blade.

Figure 5:
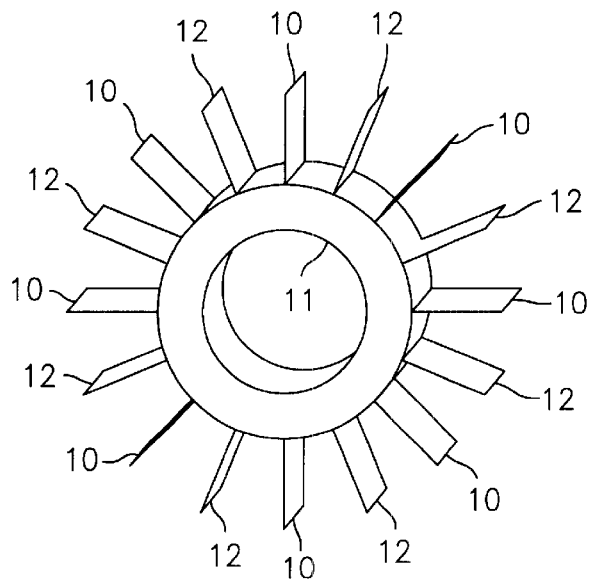
FIG. 5 is a schematic representation of an array of flow directing elements in accordance with the present invention.

In the present invention, flutter resistance of the turbomachinery arrays or blade rows is achieved by assembling an array or blade row from two flow directing element or blade types with different natural vibration frequencies in an alternating pattern. FIG. 5 illustrates such a blade row, which is assembled from alternating high frequency flow directing elements or blades 10 and low frequency flow directing elements or blades 12. The blades 10 and 12 are mounted to a disk 11 which rotates about a central axis. The speed at which the disk 11 rotates is the operating speed of the turbomachinery device such as an engine. The blades 10 and 12 may be mounted to the disk 11 using any suitable mounting technique known in the art. Further, the blades 10 and 12 may be manufactured from any suitable material known in the art. The blades may be solid or hollow. As can be seen from FIG. 5, adjacent ones of the blades 10 and 12 form passages for a working medium fluid.

It has been found that a minimum frequency difference between adjacent ones of the elements 10 and 12 should be achieved for each of the structural modes that pose a flutter threat, typically first bending (1B), first torsion (1T), and second bending (2B). In accordance with the present invention, the ratio of the 1B frequency of each high frequency flow directing element or blade 10 to the 1B frequency of each low frequency flow directing element or blade 12 should exceed 1.02. Similarly, the respective ratios of the first torsion (1T) and the second bending (2B) vibratory frequencies of each high frequency flow directing element or blade 10 to the first torsion and the second bending vibratory frequencies of each low frequency flow directing element or blade 12 should exceed 1.02, preferably at least 1.05. As previously mentioned, first torsion, first bending, and second bending form the three lowest vibratory modes of the blades 10 and 12. Also, the frequencies of the differential structural modes of each of the flow directing elements 10 and 12 should differ by at least 2.0%. For example, the 1T frequency of each high frequency blade 10 should differ by 2% or more, preferably at least 5.0%, from the 2B frequency of each low frequency blade 12.

The flow directing elements or blades 10 and 12 have the same span, the same chord length distribution along the span, and the same axial position on the disk 11. To achieve the intended difference in frequency between the high frequency flow directing elements 10 and the low frequency flow directing elements 12, the maximum thickness distribution is tailored along the span of each of the elements 10 and 12 so that the thickness distribution along the span of the high frequency flow directing element 10 is different from the thickness distribution along the span of the low frequency flow directing element 12. The thickness distribution however satisfies design constraints, such as tuning to avoid resonance within the operating range, steady stress (resulting from centrifugal pull and air loads) constraints, flow directing element mode shape constraints, and aerodynamic performance constraints. Performance considerations limit the individual airfoil section offsets of the flow directing elements 10 and 12, which offsets are the airfoil sections' center of gravity positions along the span that minimize airfoil steady stress, and the thickness distribution variation between adjacent airfoils in the outer blade span.

Figure 6:
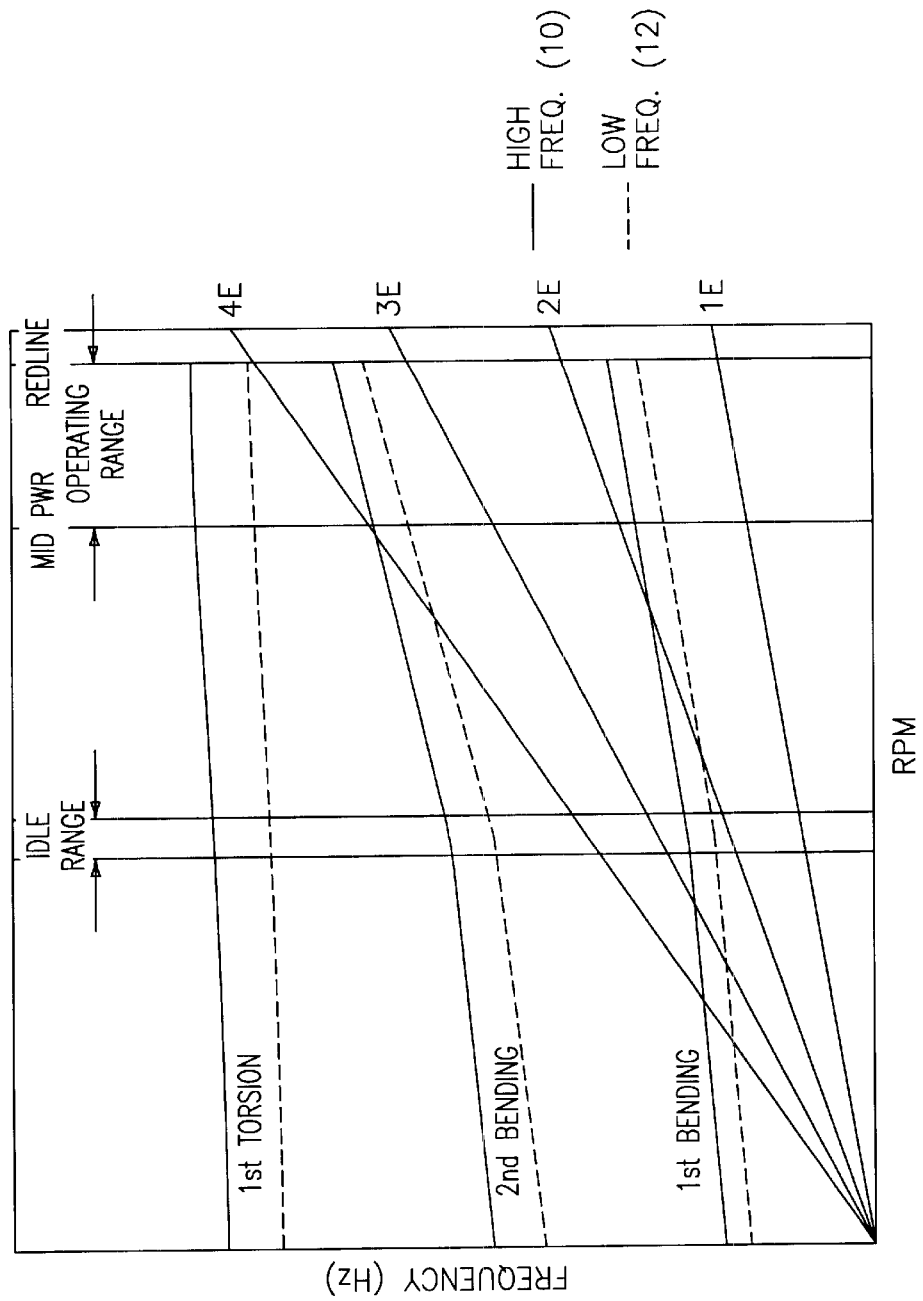
FIG. 6 is a graph showing exemplary frequency tuning requirements for a 1E pair of mistuned flow directing elements.

The mistuning philosophy which is preferably used herein and which results in the lowest weight flow directing elements is a pair of flow directing elements, one a high frequency flow directing element 10 and the other a low frequency flow directing element, both of whose 1B frequency is above 1E and below 2E at high engine rotation frequencies, i.e. a 1E blade pair. This differs from the prior art for the first rotor of multi-stage fans where the 1B frequency is above the 2E excitation frequency. The 1B frequency of both elements 10 and 12 in the pair should avoid the 2E and. 3E excitation frequencies at idle rotation frequencies. The 2B frequencies of both elements 10 and 12 in the pair should avoid integral order excitation frequencies, and therefore, are tuned between these excitation frequencies in the operating range. Further, the 1T frequency should also avoid integral order excitation frequencies and is maximized in order to provide increased resistance to flutter. FIG. 6 illustrates a frequency tuning for a 1E blade pair that results in the intended frequency mistuning while meeting the above forced response tuning criteria.

Figure 7:
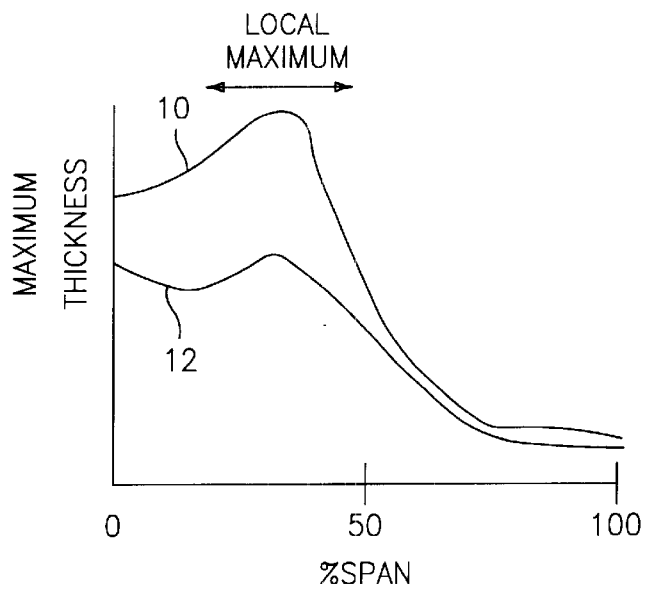
FIG. 7 is a graph showing thickness along the span of an airfoil for high and low frequency flow directing elements.

For the array of the present invention to have a 1E blade pair which meets the above forced response tuning criteria for the 1B, 2B, and 1T modes, a unique spanwise distribution of maximum blade thickness is utilized. This unique spanwise distribution of maximum blade thickness is shown in FIG. 7. Prior art blade designs typically have the maximum thickness at the root of the blade. In contrast, both flow directing elements or blades 10 and 12 in the 1E element pair of the present invention have a local maximum thickness outboard of the root, in approximately the 20–45% span range, which local maximum thickness may or may not be the maximum thickness of the respective elements 10 and 12. This thickness feature allows higher aspect ratio flow directing elements or blades 10 and 12 with increased 1T frequency without changing the bending mode frequencies. This thickness feature also separates the 2B and 1T frequencies and mode shapes, which results in a decreased torsion content in the 2B mode shape. Minimizing the torsion content of the 2B mode reduces the elements' or blades' tendency to flutter in this mode.

In the flow element pair used in the array of the present invention, the three lowest frequency vibratory modes of each high frequency flow directing element 10 are separated by at least 2.0% in frequency from any modes of each low frequency flow directing element 12. Further, each high frequency flow directing element 10 and each low frequency flow directing element 12 has a resonant frequency of the lowest frequency vibratory mode which is between a first and a second harmonic of engine rotation frequency when the engine is being operated at high speeds. The resonant frequencies of the lowest frequency vibratory modes of the flow directing elements 10 and 12 may cross the second harmonic of the device only at a relatively low speed of the operating range.

In a preferred pair of elements, each low frequency element 12 has a resonant frequency of the lowest frequency vibratory mode which is between a first and second harmonic of the device rotation frequency and each high frequency element 10 has a resonant frequency of the lowest frequency vibratory mode which is between a second and third harmonic of the device rotation frequency.

As previously mentioned, the array of the present invention has particular utility as part of a rotor assembly in a turbomachinery device such as an engine.

It is apparent that there has been provided in accordance with the present invention frequency mistuned blade rows having increased flutter stability which fully satisfy the objects, means and advantages set forth hereinbefore. While the present invention has been described in the context of specific embodiments thereof, other variations, alternatives, and modifications will become apparent to those skilled in the art having read the foregoing description. Therefore, it is intended to embrace those variations, alternatives, and modifications which fall within the broad scope of the appended claims.

What is claimed is:

1. An array of flow directing elements for use in turbomachinery devices to increase flutter stability comprising:

a plurality of flow directing elements mounted on a disk for rotation about an axis;

said plurality of flow directing elements including at least one high frequency first flow directing element and at least one second low frequency flow directing element; and said at least one high frequency flow directing element having its three lowest frequency vibratory modes at least 2.0% higher in frequency than the three lowest frequency vibratory modes of said at least one low frequency flow directing element.

2. An array according to claim 1, wherein said plurality of flow directing elements includes a plurality of high frequency flow directing elements and a plurality of low frequency flow directing elements and wherein said high frequency flow directing elements and said low frequency flow directing elements are arranged in an alternating pattern around the circumference of said disk.

3. An array according to claim 2, wherein adjacent ones of said flow directing elements form passages for a working medium fluid.

4. An array according to claim 1, wherein the three lowest frequency vibratory modes of the at least one high frequency flow directing element are separated by at least 2.0% in frequency from any modes of the at least one low frequency blade.

5. An array according to claim 1, wherein said at least one high frequency flow directing element and said at least one low frequency flow directing element have substantially the same span, the same chord length distribution along the span, and the same axial position on the disk.

6. An array according to claim 1, wherein said array forms part of a rotor and wherein each of the at least one high frequency flow directing element and the at least one low frequency flow directing element have a resonant frequency of the lowest frequency vibratory mode which is between the first and the second harmonic of the rotor rotation frequency when operated at high speeds.

7. An array according to claim 6, wherein said second harmonic may be crossed by said resonant frequencies of the lowest frequency vibratory modes only in an operating speed range at relatively low speed conditions.

8. An array according to claim 1, wherein the at least one high frequency flow directing element has a different thickness distribution along its span than the at least one low frequency flow directing element.

9. An array of flow directing elements for use in turbomachinery devices to increase flutter stability comprising:

a plurality of flow directing elements mounted on a disk for rotation about an axis;

said plurality of flow directing elements including at least one high frequency first flow directing element and at least one second low frequency flow directing element;

said at least one high frequency flow directing element having its three lowest frequency vibratory modes at least 2.0% higher in frequency than the three lowest frequency modes of said at least one low frequency flow directing element; and each of the at least one high frequency flow directing element and the at least one low frequency flow directing element having a thickness distribution with a local maximum between 20 and 45% of the span.

10. An array according to claim 9, where the local maximum is the maximum thickness of the respective flow directing element.

11. An array according to claim 1, wherein the array forms part of a rotor and wherein the at least one low frequency flow directing element has a resonant frequency of the lowest frequency vibratory mode which is between a first and a second harmonic of rotor speed and wherein the at least one high frequency flow directing element has a resonant frequency of the lowest frequency vibratory mode which is between a second and third harmonic of said rotor speed.

12. An array according to claim 11, wherein the at least one high frequency flow directing element has a thickness distribution along its span which is different from a thickness distribution along a span of the at least one low frequency flow directing element.

13. An array of flow directing elements for use in turbomachinery devices to increase flutter stability comprising:

a plurality of flow directing elements mounted on a disk for rotation about an axis;

said plurality of flow directing elements including at least one high frequency first flow directing element and at least one second low frequency flow directing element;

said at least one high frequency flow directing element having its three lowest frequency vibratory modes at least 2.0% higher in frequency than the three lowest frequency vibratory modes of said at least one low frequency flow directing element;

said array forming part of a rotor;

said at least one low frequency flow directing element having a resonant frequency of the lowest frequency vibratory mode which is between a first and a second harmonic of rotor speed;

the at least one high frequency flow directing element having a resonant frequency of the lowest frequency vibratory mode which is between a second and third harmonic of said rotor speed;

the at least one high frequency flow directing element having a thickness distribution along its span which is different form a thickness distribution along a span of the at least one low frequency flow directing element; and the at least one low frequency flow directing element having a local maximum thickness between 20 and 45% of its span.

14. An array according to claim 13, wherein the local maximum thickness is not the maximum thickness of the entire at least one low frequency flow directing element.

15. An array according to claim 13, wherein the local maximum thickness is the maximum thickness of the entire at least one low frequency flow directing element.

16. An array according to claim 9, wherein the local maximum is not the maximum thickness of the respective flow directing element.

17. An array of flow directing elements for use in turbomachinery devices to increase flutter stability comprising:
  a plurality of flow directing elements mounted on a disk for rotation about an axis;
  said plurality of flow directing elements including at least one high frequency first flow directing element and at least one second low frequency flow directing element;
  said at least one high frequency first flow directing element and said at least one low frequency second flow directing element each having a first bending mode, a second bending mode, and a first torsion mode;
  the frequency of the first bending mode of the at least one high frequency first flow directing element being at least 2.0% higher than the frequency of the first bending mode of the at least one low frequency second flow directing element;
  the frequency of the second bending mode of the at least one high frequency first flow directing element being at least 2.0% higher than the frequency of the second bending mode of the at least one low frequency second flow directing element; and
  the frequency of the first torsion mode of the at least one high frequency first flow directing element being at least 2.0% higher than the frequency of the first torsion mode of the at least one low frequency second flow directing element.

* * * * *